United States Patent [19]

Landfors

[11] Patent Number: 5,547,542
[45] Date of Patent: Aug. 20, 1996

[54] PROCESS FOR PURIFICATION AND RECYCLE OF SOLUTIONS

[75] Inventor: Johan Landfors, Sundsvall, Sweden

[73] Assignee: Eka Nobel AB, Bohus, Sweden

[21] Appl. No.: 190,534

[22] Filed: Feb. 2, 1994

[30] Foreign Application Priority Data

Nov. 15, 1993 [SE] Sweden .................................. 9303766

[51] Int. Cl.$^6$ .................................................. D21C 11/00
[52] U.S. Cl. ........................ 162/29; 162/50; 162/DIG. 8; 204/529; 204/634; 210/748; 205/503; 205/510; 205/464; 205/618; 205/749
[58] Field of Search .................................. 162/29, 50, 75, 162/192, DIG. 8; 204/182.3, 182.4, 182.5, 149, 152; 210/928, 748, 162, 204, 210

[56] References Cited

U.S. PATENT DOCUMENTS

| | | |
|---|---|---|
| 3,986,951 | 10/1976 | Fremont ..................................... 204/95 |
| 4,995,983 | 2/1991 | Eadie et al. ............................... 210/639 |
| 5,061,343 | 10/1991 | Azarniouch et al. ...................... 162/16 |
| 5,122,240 | 6/1992 | Conley et al. ............................ 204/201 |
| 5,127,992 | 7/1992 | Davies et al. ............................. 162/29 |
| 5,139,632 | 8/1992 | Chlanda et al. ....................... 204/182.4 |

FOREIGN PATENT DOCUMENTS 0405619 1/1991 European Pat. Off. .
WO90/12637 11/1990 WIPO .

OTHER PUBLICATIONS

Hynninen, Pertti, "Effluent Treatment", Pilot Plant . . . organic material, Feb. 1989 TAPPI Journal, pp. 167–170.
Bertel Myreen, "Closing up the Bleach Plant: A Research Program Into Effluent Evaporation", APPITA '91/187–191.

*Primary Examiner*—David L. Lacey
*Assistant Examiner*—Dean T. Nguyen
*Attorney, Agent, or Firm*—Burns, Doane, Swecker & Mathis, L.L.P.

[57] ABSTRACT

The invention relates to a process for treating a low-concentrated aqueous feed solution which includes at least one aqueous process stream from a pulp mill. The process includes concentrating the feed solution by evaporation to form an evaporation concentrate, and subjecting at least a part of the concentrate to a first electrodialysis treatment, thereby forming a first electrodialysis concentrate containing salt removed from the evaporation concentrate and at least one diluate depleted in the salt. The invention also relates to a plant for carrying out the above process.

20 Claims, 3 Drawing Sheets

5,547,542

PROCESS FOR PURIFICATION AND RECYCLE OF SOLUTIONS

SUMMARY OF THE INVENTION

This invention relates to a process and a plant generally as defined in the enclosed claims.

Thus the invention relates to a process for treating a low-concentrated aqueous feed solution comprising a salt solution, especially comprising at least one aqueous process stream from a pulp mill, especially a process stream containing organic dissolved and/or undissolved materials. Said process comprises concentrating the solution by a treatment comprising evaporation, and subjecting at least a part of, or all of, the concentrated feed solution, also denoted evaporation concentrate, to a first electrodialysis treatment, for forming a first electrodialysis concentrate containing salt removed from the evaporation concentrate and at least one diluate depleted on said salt.

The feed solution may prior to the evaporation treatment be subjected to a preliminary purification treatment, e.g. filtration, cetrifugation, flotation or other mechanical and/or chemical separation treatments, for removing liquid and especially solid impurities.

The feed solution especially comprises at least one process stream, e.g. effluent, from a chlorine containing bleaching process.

The evaporation concentrate produced in the evaporation treatment especially amounts to a residual volume of at most 50% of the volume of the feed solution.

Preferably the evaportion concentrate is purified by a chemical and/or mechanical treatment prior to the electrodialysis.

The invention is thus especially related to a process in which the feed solution comprises one or more aqueous process streams from a pulp mill, such as a wood pulp or other cellulosic pulp mill, and especially pulp bleach process streams, such as bleach effluent streams. The latter are formed e.g. in a chlorine containing bleach process or step, such as a chlorine or chlorine oxide bleach process, and contain e.g. chloride and/or chlorate. The feed solution can also comprise streams formed in an oxygen, ozone or peroxy compound, e.g. hydrogen peroxide, bleach process or step, or other bleach processes or steps, or combinations of any two or more such bleach processes or steps.

The process according to this invention may, together with or as one or more mechanical and/or chemical purification step(s), especially as a first purification step after the evaporation step, comprise one or more of filtration, centrifugation, ultra-filtration, membrane filtration and flotation, for separating solid and/or liquid dispersed and especially precipitated materials from the solution, which forms a continuous phase.

Generally, it is suitable to maintain the solids content in the concentrated solution in the evaporator below about 20% by weight, such as below 10% or optionally below 5%, by weight, e.g. by adding water or diluate recirculated in the process. Solids content is counted as dry solids content with respect to organic and inorganic materials in the evaporator solution.

According to another aspect of the invention, a high current efficiency for recovering ions, especially chlorine and/or chlorate ions, especially when present together in the feed solution, e.g. in quantities which are common in chlorine based bleaching process streams, especially effluent streams, can be maintained in the electrodialysis treatment of the concentrated solution. Thus it may be possible and preferable to maintain a total current efficiency of at least 60% or at least 70% or optionally at least 80%, e.g. for the combined removal of anions, such as chlorine and chlorate ions, whereof the current efficiency for the chlorate ion may be e.g. at least 2%, especially at least 10% or at least 20%. Preferably the current density is maintained in the range, and especially in an upper part of the range wherein chlorine as well as chlorate ions show an essentially linear increase of the mass transport through the membranes with increasing current density in the electrodialysis.

Thus, the invention relates according to a preferred embodiment to a process for purification and recycling of bleach process streams, especially bleach effluents, e.g. from a closed pulp mill, comprising evaporation of combined or separate bleach process streams, precipitation and separation of organic substances, especially for recycle to a recovery furnace or other suitable furnace for incineration, and desalination by electrodialysis of the resulting aqueous salt solution, normally essentially or entirely of inorganic materials, to form a diluate with reduced salt concentration and a first electrodialysis concentrate of the salts in aqueous solution. The diluate can be at least partly recycled to the evaporator in order to decrease the salt concentration therein and to decrease thereby the temperature needed for performing the evaporation. This may be important especially when the evaporator comprises surfaces of materials of reduced temperature resistance, such as plastics. The evaporation is preferably performed at sub-atmospheric pressure. The diluate may also be recycled to washing steps in the bleaching sequence or to scrubbers or to other places in the pulp mill where water addition is needed. The first electrodialysis concentrate of feed solution comprising a chlorine compound containing bleach effluent often contains mainly chlorate and harmless inorganic salts like sodium chloride and sodium sulphate and may be sewered to the sea after a conventional chlorate destruction. It is, however, posssible to recover the inorganic salts, especially if they are mainly chloride and chlorate, and purify these further, e.g. for use in a plant for production of sodium chlorate for bleaching. In this case the pulp mill may be closed in a very broad sense.

BACKGROUND OF THE INVENTION

The environmental aspects of pulp and paper manufacture has been in focus for the industry during the past 15 years. Starting with efforts to reduce colour, COD and BOD in bleach effluents and $SO_2$ in flue gases the emphasis has very much been on reducing chlorinated organics resulting from chlorine based bleaching. Chlorine dioxide bleaching has shown to be an environmentally friendly process. Also totally chlorine chemical free (TCF) bleaching has been developed. In order to reduce all environmental impact of pulp manufacture the industry is now seeking ways to "close" the mill, or in other words eliminate effluents and instead remove a small amount of waste in solid form under controlled conditions. In the totally closed pulp mill this waste will contain only the trace elements once taken up from the ground by the trees and it is the ultimate goal that these can be fed back to the forestal areas.

In Tappi J. Febr. (1989) p. 167–170 it is disclosed that lignin can be separated from bleach effluents. Acid and alkaline effluents are mixed with fibres and a cationic polymer. This gave a reduction of 41 to 67% of the content of chemical oxygen demanding constituents, measured as $COD_{Cr}$.

Other ways to treat bleach plant effluents have also been described, see APPITA '91/187–191. A process is described where the effluent volume is reduced by evaporation in a low temperature evaporator and the produced condensate is recycled back to the pulping process. The remaining concentrate can be further evaporated and burnt to obtain an inorganic salt for landfilling. The evaporation of solutions with high salt concentrations is known to be difficult due to problems with incrustation and increasing boiling temperature. To obtain a total incineration of the bleach plant effluent, it is therefore necessary to combine the first evaporator with expensive and energy consuming high effect evaporators. The process need a separate furnace that can manage combustion of organics in presence of large amounts of chloride.

U.S. Pat. No. 3,986,951, assigned to Champion Int Corp., discloses an effluent treatment process for a chlorine based bleachery including organics and solids removal before electrodialysis and brine electrolysis. The effluent from the chlorine stage is treated by adding $Al^{3+}$ to precipitate organics and suspended solids, filtered and then electrodialyzed to form a diluate stream containing 200 to 600 ppm NaCl which is returned to the bleachery and a concentrated stream containing 5–10 wt % NaCl. The latter stream is concentrated further by evaporation to 25 wt % and electrolyzed to form $Cl_2$, NaOH and NaOCl. The process is said to permit reusage of water, recovery of chemicals and reduction of sludge if integrated in a pulp mill. This process treats an effluent with low concentration of organics. Thus, it is difficult to obtain an efficient precipitation of organics which increases the risk of negative effects of scaling in the electrodialysis cell. The use of aluminum makes it impossilble to recycle the obtained precipitate to the existning furnaces. At the same time the concentration of inorganic salts is very low. The electrodialysis stack must therefore be operated at a low current density and with large effluent volumes which gives large process equipment and high investment cost.

DETAILED DESCRIPTION OF THE PREFERRED EMBODIMENTS

Figure 1:
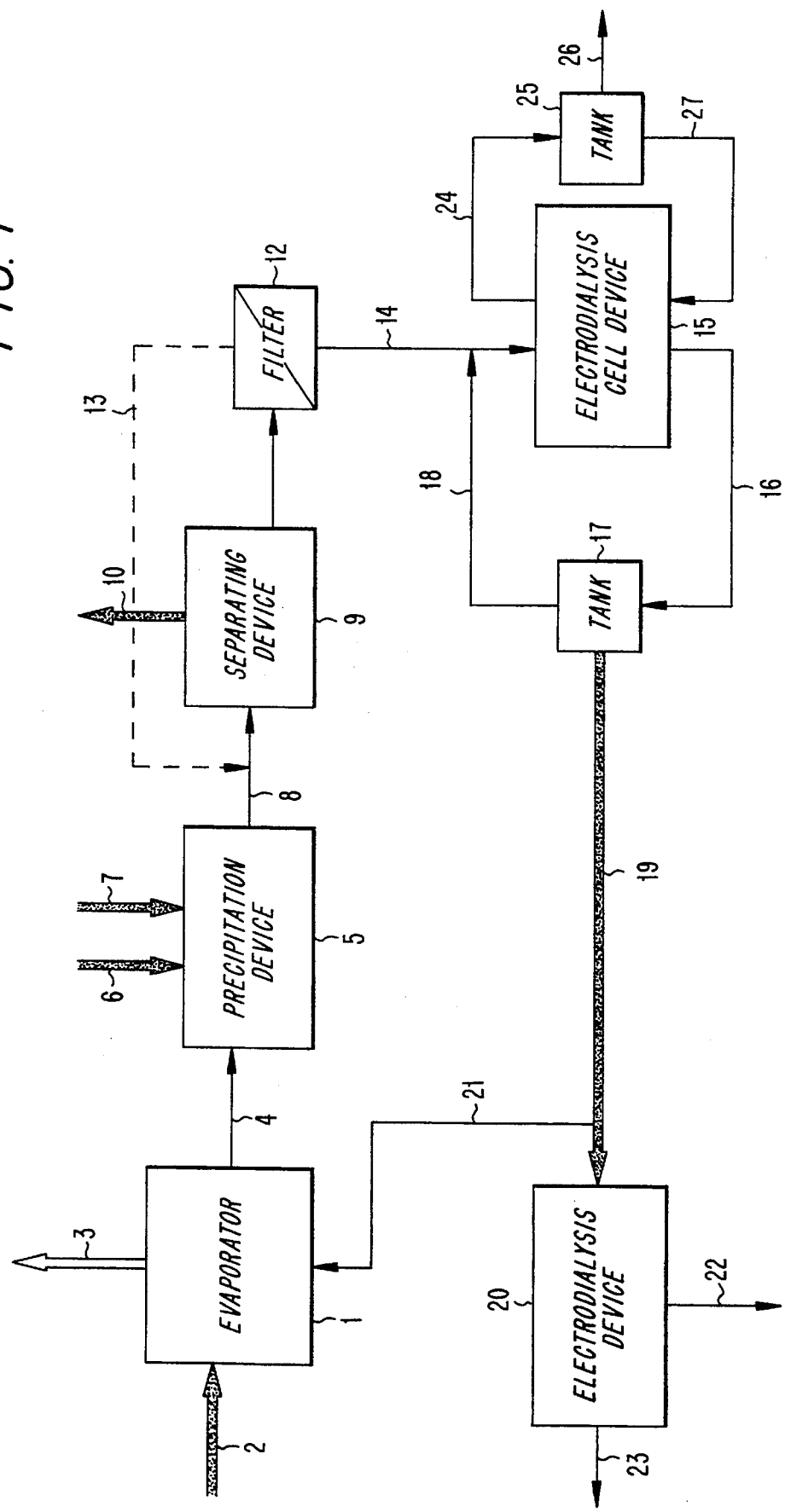
FIG. 1 shows an example of a flow sheet for a plant which is suited for carrying out embodiments of the process according to the invention.
Figure 2:
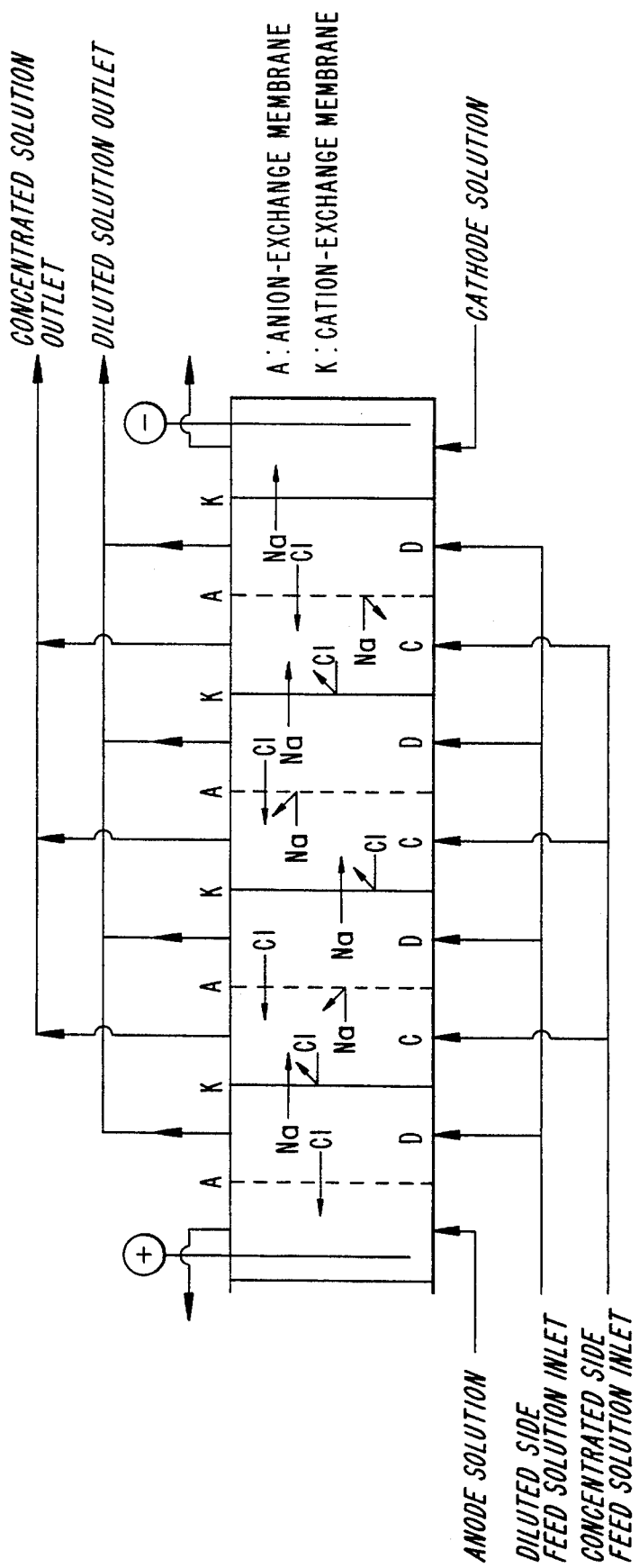
FIG. 2 shows an example of a flow sheet for an electrodialysis device which is suited for use in the process according to this invention and FIG. 3 shows an example of a graph of the voltage vs. current density for an embodiment of this invention.

FIG. 1 shows a simplified flow sheet of a plant comprising as a first concentration device an evaporator 1, with an inlet conduit 2 for a feed solution, a first outlet conduit 3 for separated liquid or vapour, and a second outlet conduit 4 for the concentrated liquid connected to a precipitation device 5. Arrows 6,7 indicate inlets for precipitating agents. An outlet conduit 8 from the device 5 is connected to a separating device 9, which may be e.g. a filter, centrifuge, flotation means or any other suitable means for separating the precipitate from the solution. An arrow 10 indicates the removal of the precipitate from the device 9. The separated solution is removed through an outlet conduit 11 connected to a further separating device 12, such as a filter. A conduit 13 for back-washing the device 12 extends to the conduit 8. The precipitation device 5 and separation devices 9 and 12 act as purification devices for purifying the concentrate. An outlet conduit 14 for the separated evaporation concentrate is connected to the inlet of an electrodialysis cell device 15 for feeding said concentrate into said device 15. A first outlet conduit 16 for the depleted concentrate, also denoted diluate, is connected to a tank 17, from which a recirculation conduit 18 extends for recirculation of diluate to the electrodialysis device 15. A second outlet conduit 19 can be used for transferring diluate to an optional second electrodialysis device 20, back to the concentration device 1 through a conduit 21 or to other uses or disposal. The second dialysis concentrate, formed in the device 20, is removed through a conduit 22 and the diluate through a conduit 23 from the second electrodialysis device 20. The first electrodialysis concentrate is removed through a conduit 24 to a tank 25, from which this concentrate can be withdrawn through a conduit 26, e.g. to a not shown device for utilizing the dissolved salt or for disposal. Through a second conduit 27 concentrate can be recirculated to the electrodialysis device 15.

The flow sheet indicated on FIG. 1 is only an example and can be modified in many ways obvious to an expert from the disclosure in this specification and the publications cited herein.

As is mentioned above the exemplified embodiment of the invention is related to a process for purification and recycling of bleach effluents from a pulp mill, but the invented processes and devices are generally applicable also for treating other feed solutions, especially solutions with a relatively low concentration of dissolved salt(s), especially inorganic salt(s), and dissolved and/or undissolved organic constituents which should be removed from the feed solution.

In a first step, using a preferred embodiment of the invention, the combined or separate bleach effluent(s) is/are subjected to an evaporation treatment, to obtain a concentrated bleach effluent. Before feed to the evaporator the bleach effluent is optionally flitrated to remove particulate matters like for example fibers, precipitated resin, lignin, oxalates or sulphates, and materials in general which may cause problems in the concentration treatment. The filtration can also be installed on a combined feed and recycle flow to the evaporator. The degree of evaporation is suitably to at most 50%, preferably at most 25% or at most 15% residual volume, and suitably to at least 1% and usually at least 3% residual volume. The evaporation can be made in any type of evaporator but a low temperature energy efficient evaporator is preferred. The condensate from the evaporator is preferably purified from low molecular weight organic, volatile substances, and can be recycled, e.g. to the washing steps of the bleach plant or other parts of the pulp mill where the quality of the water is acceptable.

The pH of the concentrated feed solution, i.e. in this case the concentrated bleach effluent, is suitably adjusted to below about 9 or especially below about 7 or below 4 or 3.5, and preferably to above 0.5 or above 2. The adjustment of pH may be sufficient for causing precipitation of organic materials. The precipitation of organics can also be achieved, or be further enhanced by addition of precipitating chemicals, optionally together with the pH adjustment. Preferably, these chemicals are organic in order to facilitate use or combustion of the precipitate within the pulp mill. Suitable such organic precipitating chemicals are e.g. substances, especially polymers, with high molecular weight, e.g. with a molecular weight of at least 500,000 or at least 1,000,000 and e.g. up to 5,000,000. Examples of such materials are e.g. polyethyl cellulose, cellulose derivatives, such as ethyl-hydroxyethyl-cellulose, polyacrylamides, polyamine resins, starch derivatives, and similar materials, preferably within the molecular weight ranges stated above, which are efficient agents for flocculation and dewatering. It is preferred to get a precipitate with as high solids content as possible. At the same time the residual organics in the solution phase should be as low as possible to facilitate an efficient and long term stable electrodialysis. At the same time residual water in the precipitate will increase the salt, especially the chloride and chlorate content in the precipitate, which may make it more difficult to incinerate in standard furnaces available at the pulp mill. Due to the same reason, it is less suitable to use inorganic precipitation chemicals to improve flocculation and separation. However, it has been found that the removal of organics from the concentrated effluents can be improved by additions of organic polymers, as mentioned above. It has been confirmed that combinations of high molecular polyethylene oxide and/or cellulose derivates, e.g. ethyl hydroxy ethyl cellulose, can be used for this purpose. Other organic polymers, e.g. polyacryl amide, polyamine resin, starch derivates and similar, that are efficient for flocculation and dewatering can also be used in the precipitation and separation steps, but also for further dewatering of the obtained sludge. The acidification can suitably be made with mineral acids and acid salts thereof, e.g. sulphuric, hydrochloric and/or phosphoric acid and/or acid salts of such acids, single or in mixture, or by electrochemical processes. The resulting organic precipitate is separated by centrifuge, filtration, flotation, or other suitable means for solid/liquid separation. Other suitable separation methods, such as membrane filtration or ultra filtration can also be used. The obtained organic precipitate is preferably taken to an existing furnace, preferably a (soda) recovery furnace. Other furnaces could also be used.

If the recovery cycle is very sensitive to inorganic salts in the solution, such as chloride feed, the precipitate can be washed with water or acid before being fed to the recovery furnace. Normally the chloride content in the precipitate represents only 0.2 to 2.5 kg/tonne of pulp, which is low enough to enable direct feed to the recovery furnace without washing. The precipitate can also be washed to a remaining inorganics content of preferably at most 3 kg, especially at most 1.5 kg or at most 0.5 kg, e.g. calculated as Cl per tonne of pulp. In case of limiting capacity in the recovery furnace the precipitate can be recycled to other suitable furnaces for incineration. The water solution resulting from the precipitation step can be subject to further purfication steps, e.g. filtration, activated carbon or precipitation with inorganic precipitation chemicals, before it is subjected to electrodialysis to form a diluate with reduced salt concentration and a concentrate of the inorganic salts in water solution. The electrodialysis cell comprises at least one anion selective and one cation selective membrane between an anode and a cathode. Normally the cell comprises multiple pairs of alternating anion selective and cation selective membranes between one anode and one cathode. Pairs of membranes form between them compartments with inlets and outlets for feeding liquids to and withdrawing liquids from said compartments. When the purified bleach effluent is fed into the cell, the anion will migrate through the anoion selective membrane towards the anode and the cations will migrate through the cation selective membrane towards the cathode. The water solution will be depleted in salt and is called diluate. The diluate can be recycled at least partially to the evaporator in order to decrease the salt concentration therein leading to a more energy efficient evaporation and less incrustation and need for cleaning of the evaporator and permitting evaporation with a lower heating medium temperature, and may also be recycled to washing steps in the bleaching sequence or to scrubbers or to other places in the pulp mill where water addition is needed. The diluate can also be subjected to one or more desalination treatments, preferably to one or more electrodialysis treatments for further reduction of the salt content therein. It is preferred to operate the electrodialysis stacks at a high current density to minimize the size and the investment cost. Preferably the current density is from about 10 and suitably up to 10000 $A/m^2$, preferably from about 300 $A/m^2$ and more preferably from about 500 and suitably up to 3000 or up to 1500 $A/m^2$. However, the optimal current density depends to a large extent on the amount of chemicals added, e.g. in the bleachery when treating bleach process streams, the degree of evaporation, and on the amount of soluble salts or acids added in the precipitation step(s). Electrodialysis can be performed in electrodialysis stacks operating in parallel and/or in series, and with liquid stream flow in parallel and/or in series.

The obtained diluate can be further desalinated in additional electrodialysis stacks operating at lower current densities to obtain a higher degree of desalination before recycle to the evaporator.

The part of the diluate that is not recycled to the evaporator can be desalinated in a separate electrodialysis stack to obtain an almost salt free diluate which can be recycled to a pulping process with no risk of gettimg problems with chlorides in the recovery system.

The concentrate is suitably formed in every second chamber of the electrodialysis cell and may contain only chlorate (in case of chlorine dioxide bleaching) and harmless inorganic salts in concentrations between 20 and 250 grams per liter and may be sewered, e.g. to the sea after a conventional chlorate destruction such as with $SO_2$, sulphite or anaerobic biological treatment. It is, however, possible to recover the inorganic salts, which may be mainly chloride and chlorate, and purify these further for use e.g. in a plant for production of sodium chlorate for bleaching. In this case the pulp mill may be closed in a very broad sense. In case heavy metals or other metals harmful to the pulping process are present in the bleach effluent, these may be separated in the electrodialysis step and collected in the concentrate stream, where they may be removed by conventional brine purification processes, many of which are well-know e.g. from patents belonging to this applicant and others.

By applying the invention it is possible to use only one low effect evaporator for removing most of the water in the treated process streams since the increase in boiling temperature can be avoided by taking out the organics and the soluble salts separately and recycling the obtained purified diluate to the evaporator. The process also makes it possible to withdraw organics with low enough content of chloride and/or other constituents which are polluting or may cause corrosion and other difficulties, thereby facilitating incineration in existing furnaces.

The process is preferably operated so that the effluent is evaporated to a residual volume that gives an efficient flocculation and separation of organic matter. The degree of evaporation depends on the amount of residual organics and also on the concentration of dissolved inorganic material. The flocculation and precipitation is preferably controlled by measuring the pH and adding acid materials to keep it constant at an optimal level for that specific effluent. The separation of precipitated and/or flocculated material is controlled so that the solution phase is substantially free from particulate matter. This can be done by e.g. monitoring the turbidity prior to electrodialysis. To perform the electrodialysis in a cost efficient way, it is preferred to have a fairly high salt concentration. This can be controlled by measuring the conductivity in the concentrate from the evaporator or in the solution phase after the separation.

Below a number of examples are given mainly for illustrating the invention and not for restricting the scope of protection.

EXAMPLE 1

A combined bleach effluent from the D and E stages of a sulphate softwood pulp mill was evaporated to a residual volume of 5%, and with a content of organics, measured as $COD_{Cr}$, of 19.3 g/l. The concentrated effluent was acidified with concentrated sulphuric acid to different pH between 1.0 and 3.0. The formed precipitate was separated off by centrifugation and analysed with respect to chloride content and weight-% of precipitate in relation to the total sample volume. The solution phase was analysed for $COD_{Cr}$. The results are shown in the table below where it has been assumed that the total effluent volume, 40 m³ per tonne of pulp, is treated according to the invention:

| Sample No | pH | Cl to recovery furnace [kg/ tonne of pulp] | Precipitate [wt %] | $COD_{Cr}$ in solution [g/l] |
| --- | --- | --- | --- | --- |
| 1 | 1,0 | 1,00 | 9,1 | 11,1 |
| 2 | 2,0 | 0,58 | 7,5 | 11,9 |
| 3 | 3,0 | 0,23 | 4,1 | 16,5 |

EXAMPLE 2

In another experiment different polymer precipitation chemicals, polyethylene oxide (PEO) and cellulose derivatives (CD), were used in addition to sulfuric acid to improve the flocculation and separation of organics from an effluent evaporated to 10% residual volume. The clear solutions were analyzed for $COD_{Cr}$. The results are shown in the table below.

| Sample No | pH | PEO [mg/l] | CD [mg/l] | $COD_{Cr}$ in solution [g/l] |
| --- | --- | --- | --- | --- |
| 4 | 3 | — | — | 10.9 |
| 5 | 3 | 2 | 2 | 7.2 |
| 6 | 3 | 5 | 10 | 6.9 |

EXAMPLE 3

A combined total bleach effluent from a sulphate softwood pulp mill was evaporated to 10% residual volume. The concentrate was acidified to pH 3 and the precipitated organic substances were separated by centrifugation. The resulting water solution contained 69.0 mM chloride and 11.9 mM chlorate. During electrodialysis at 0.3 kA/m² the chlorate was completely removed and the chloride concentration in the diluate was 12.5 mM. The total current efficiency was 83.7 for removal of chloride and chlorate. The removed chlorate and chloride ions were collected in the concentrate stream from the cell.

EXAMPLE 4

Figure 3:
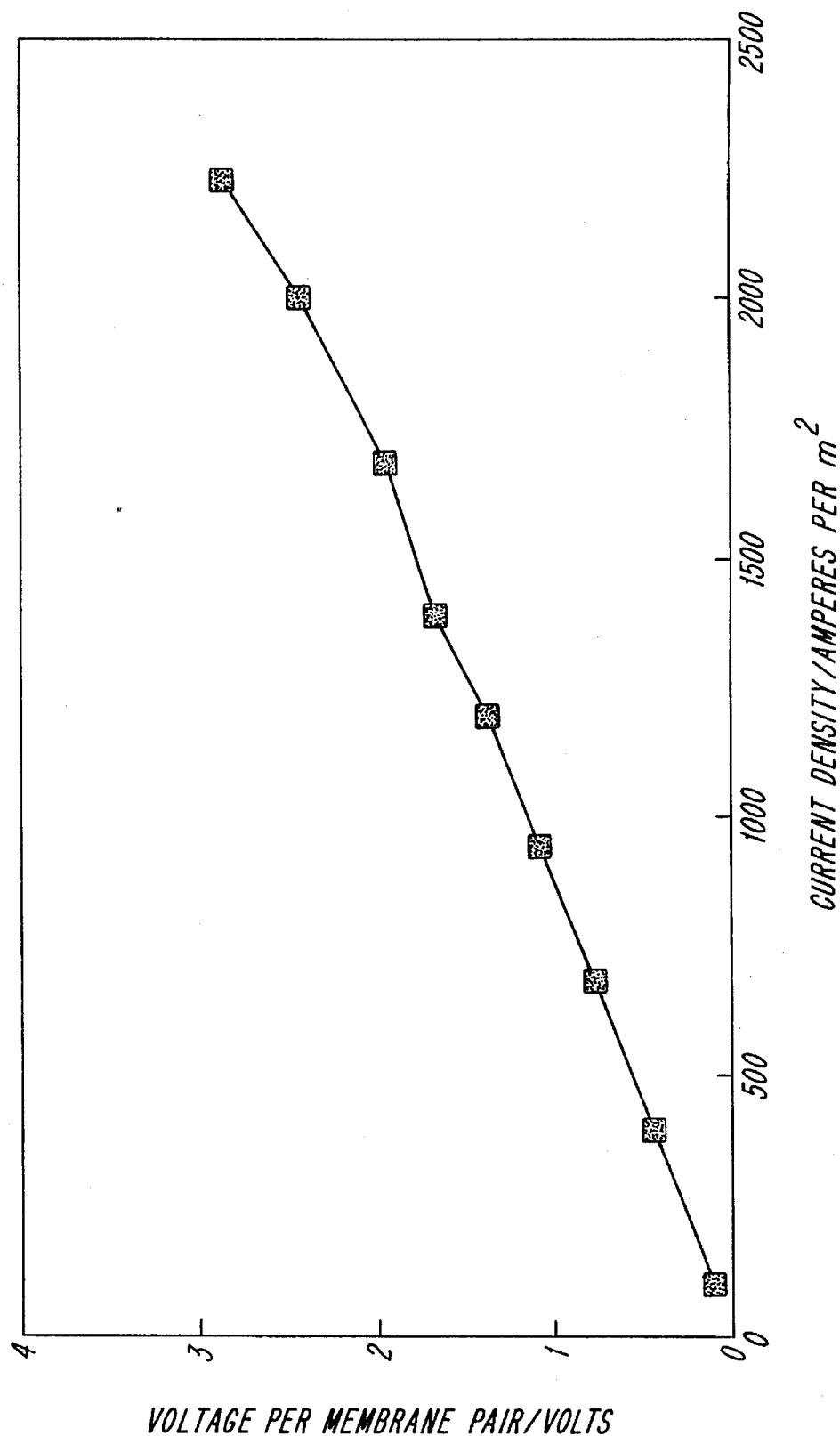

A combined total bleach effluent from a sulphate softwood pulp mill was evaporated to about 5% residual volume. The concentrate was acidified to pH 2 with concentrated sulfuric acid and the flocculated organic substances were separated by centrifugation. The resulting water solution contained 240 mM chloride and 27 mM chlorate. The solution phase was subjected to electrodialysis in a laboratory stack. By measuring the current vs voltage behavior it was found that the maximum current density was above 2.0 kA/m² for that particular effluent concentrate, see the graph in FIG. 3 of the enclosed drawings, which shows a linear relationsship between the voltage per membrane pair vs. current density over the range 0.1 to 1.5 kA/m². The concentrate was then desalinated at a constant current density of 1.0 kA/m². The current efficiency for removal of chloride and chlorate was 92%.

What is claimed is:

1. A process for purifying and concentrating a dilute aqueous process stream containing salt from a pulp mill, which process comprises concentrating the dilute aqueous process stream by evaporation in an evaporator to form an evaporation concentrate, and subjecting at least a part of said concentrate to a first electrodialysis treatment so as to form a first electrodialysis concentrate containing salt removed from the evaporation concentrate and at least one diluate depleted of said salt.

2. A process according to claim 1, wherein the process stream comprises at least one effluent from a chlorine containing bleaching process.

3. A process according to claim 1, wherein the volume of the evaporation concentrate produced in the evaporation treatment amounts to a residual volume of at most 50% of the volume of the process stream.

4. A process according to claim 1, wherein the evaporation concentrate is purified by a chemical and/or mechanical treatment prior to the electrodialysis.

5. A process according to claim 4, wherein the purification of the evaporation concentrate comprises acidifying to a pH below 7.

6. A process according to claim 4, wherein the purification of the evaporation concentrate comprises adding high molecular weight organic precipitating material to the evaporation concentrate to precipitate art solid organic materials.

7. A process according to claim 4, wherein the purification of the evaporation concentrate results in separation of solid organic materials which are burned in an incinerating device.

8. A process according to claim 1, wherein said first electrodialysis is performed in at least one electrodialysis device comprising at least one anion-selective and at least one cation-selective membrane arranged between an anode and a cathode, said membranes forming between them compartments with inlets and outlets for feeding the evaporation concentrate salt solution stream into such compartments, and bringing, with the aid of an electric current between the anode and the cathode, ions to migrate from the evaporation concentrate salt solution through the said at least one anion-selective and the at least one cation-selective membranes to solvent streams passing through adjacent compartments, and forming at least one diluate stream of the thus depleted salt solution and at least one first electrodialysis concentrate stream containing the ions migrated from the evaporation concentrate, said diluate optionally at least partially being recirculated to an electrodialysis process and/or to the evaporation step, and said first electrodialysis concentrate optionally being partially recirculated to an electrodialysis device for renewed concentration.

9. A process according to claim 8, wherein said first electrodialysis is performed in a plurality of electrodialysis devices.

10. A process according to claim 9, wherein said plurality of electrodialysis devices are electrically connected in series, in parallel, or both.

11. A process according to claim 9, wherein said plurality of electrodialysis devices are connected so as to be in liquid flow communication.

12. A process according to claim 8, wherein said at least one electrodialysis device comprises a plurality of unit cells formed by a plurality of said anion-selective and cation-selective membranes in stacked arrangement between said anode and cathode.

13. A process according to claim 1, which comprises performing the electrodialysis of the evaporation concentrate with a current density of at least 0.01 kA/m$^2$.

14. A process according to claim 1, wherein the diluate stream is at least partially recycled to the evaporator for maintaining the solids content in the evaporator below about 20% by weight.

15. A process according to claim 1, wherein the first electrodialysis concentrate is at least partially subjected to an electrolysis treatment for transforming a chloride salt into a product selected from the group consisting of chlorine, sodium hydroxide, hydrochloric acid, chlorate and mixtures thereof.

16. A process according to claim 1, wherein the diluate from the first electrodialysis treatment is subjected to a second electrodialysis treatment for further salt removal, optionally prior to recycling to uses in a pulping process different from the evaporation concentration.

17. A process according to claim 1, wherein the first electrodialysis treatment is controlled to give a first electrodialysis concentrate containing as main salt constituents a mixture of chloride and chlorate salts, said first electrodialysis treatment being performed with a total current efficiency for the removal of chloride and chlorate ions from the input to the output of the first electrodialysis concentrate at least 60%.

18. A process according to claim 17, wherein the current efficiency for chlorate ions is at least 20%.

19. A process according to claim 17, wherein the current efficiency for chlorate ions is at least 10%.

20. The process according to claim 1 wherein the at least one diluate stream depleted of said salt is at least partially recycled to the evaporator.

* * * * *